Aug. 24, 1948.  J. D. SEAVER  2,447,880
MAGNETOMETER
Filed Aug. 24, 1945
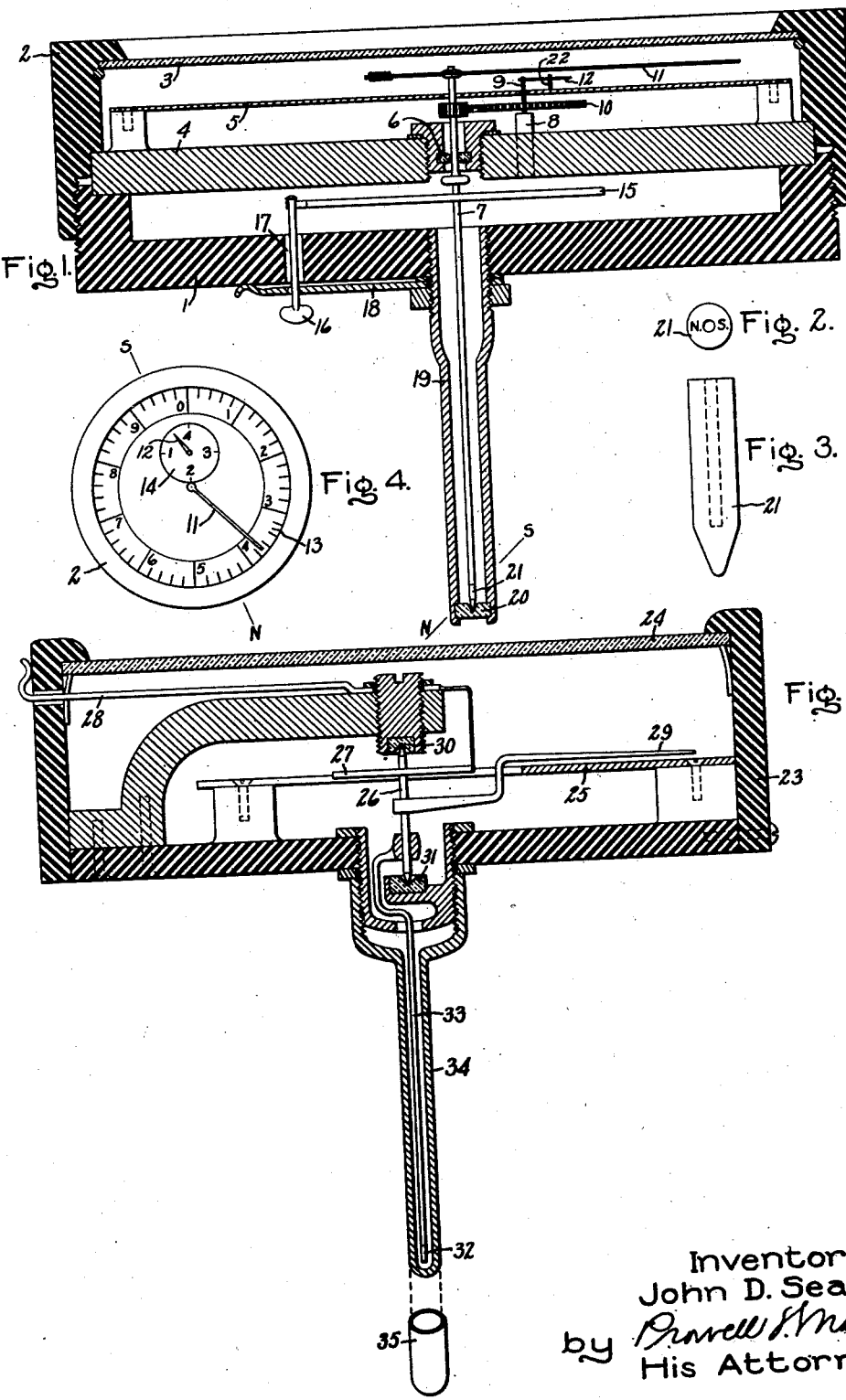
Inventor:
John D. Seaver,
by Orwell F. Mack
His Attorney.

Patented Aug. 24, 1948

2,447,880

UNITED STATES PATENT OFFICE 2,447,880

MAGNETOMETER

John D. Seaver, Marblehead, Mass., assignor to General Electric Company, a corporation of New York Application August 24, 1945, Serial No. 612,366

5 Claims. (Cl. 175—183)

My invention relates to instruments for measuring the strength of unidirectional magnetic fields, and its object is to provide a small portable instrument which will measure such fields with good accuracy including the field strength across small air gaps. The magnetometer instrument also indicates the direction and polarity of the field measured.

In carrying my invention into effect, I provide a small permanent magnet rotor mounted on a pivoted shaft which is free to turn against the torque of a spring. The shaft is arranged to extend from the body of the instrument in the nature of a prod with such permanent magnet rotor at the end of the prod so that it can be inserted into small air gaps and the like for field measurement purposes. Measurements are made by inserting the prod into the field to be measured and turning the body of the instrument until the maximum spring and pointer deflection is obtained. The pointer is then read on a uniform scale previously calibrated in suitable field strength units. The instrument may be arranged to permit of the pointer making several revolutions, with a second pointer geared to the shaft to count the revolutions, thus allowing for field measurements over a wide range of values.

The features of my invention which are believed to be novel and patentable will be pointed out in the claims appended hereto. For a better understanding of my invention, reference is made in the following description to the accompanying drawings in which Fig. 1 represents a form of my invention in which the large pointer is arranged to make several revolutions if that is desired. Figs. 2 and 3 are enlarged end and side views of a silver-aluminum-manganese permanent magnet rotor which for convenience in the construction of the instrument is in the form of an instrument pivot. Fig. 4 represents a face view of the instrument of Fig. 1, and Fig. 5 represents a form of my invention equipped with a removable protective cap and a removable shunt.

Referring now to Fig. 1, I have here shown a cross-sectional view through one of my instruments which may have a casing 1 made from any suitable insulating material having a removable cover 2 provided with the transparent window 3. Within the casing is a cross piece 4 which supports a scale plate 5, a ring stone bearing 6 for the main instrument shaft 7, and a bearing 8 for an auxiliary pointer shaft 9 geared to shaft 7 by gearing 10 which in the example given may have a four-to-one ratio, such that shaft 7 makes four revolutions to one of shaft 9. Shafts 7 and 9 are provided with long and short pointers 11 and 12 which indicate on suitable scales 13 and 14, respectively, on the upper surface of scale plate 5, so that the pointer positions can be read through the window 3, as shown in Fig. 4. A long spiral spring 15 has its inner end secured to shaft 7 and its outer end fastened to a zero adjustment member 16 which may, for convenience, be adjustable through an arc-shaped slot 17 in the bottom wall of casing 10 and locked in place by a friction locking arm 18 rotatable about the axis of shaft 7.

From the bottom of the casing in line with shaft 7 there is a small diameter tubular extension 19 in the nature of a prod. The diameter of the tube 19 is usually smaller than as illustrated in Fig. 1. This tubular extension is in effect a part of the casing into which the shaft 7 extends to a jewel bearing 20 in the reduced diameter end of the prod. The end of shaft 7 which is pivoted in the jeweled bearing at 20 is formed by a small permanent magnet 21, polarized across the diameter of the shaft. The remainder of the shaft 7 is of nonmagnetic material as are also all metal parts of the instrument except the magnet 21.

It is satisfactory to form a pivot from and at the exposed end of magnet 21 although a separate pivot of tungsten tantalum may also be used. The magnet 21 may have a small hole through its axis to facilitate securing it to shaft 7 and to a separate pivot if one is used.

The magnet 21 may have an outer diameter of 0.03 inch and a full diameter length of 1/8 inch. The outer diameter of tube 19 at the magnet end may be as small as 0.057 inch, so that the prod may be inserted into an air gap as small as 1/16 inch for the purpose of measuring the flux field across such gap.

For convenience the pointer 11 may be mounted on shaft 7 in line with the line of polarization of magnet 21, say, with the pointer pointing in the direction of the south pole of magnet 21. Then when the prod is inserted into a unidirectional field to be measured, the shaft 7 will tend to turn so that the pointer 11 points in the direction of the north pole of such field. Suppose, for example, the unknown field has a direction which is not at right angles to shaft 7 such as is represented by the line designated N—S in Fig. 1. It will be evident that the instrument will have maximum torque when the unknown field is at right angles to the shaft 7. Hence this right angle relation can be obtained by orienting the casing until the instrument shows maximum torque. In the example given this would require tipping the instrument to the left in Fig. 1. Having thus found the orientation which produces maximum torque, assume we obtain a reading such as is represented in Fig. 4. To find the direction of the field at right angles to shaft 7, the casing as a whole is now rotated about its shaft axis until both pointers read zero. This indicates zero spring tension and the pointer 11 points in the direction of the north pole of the unknown field. In Fig. 4 the pointer 11 tries to point in the direction of the north pole of the field designated N—S, and there is sufficient instrument torque to rotate pointer 11 to the position shown from its zero position against the torque of spring 15. Now by tipping the instrument without rotating it about its shaft axis until the maximum indication is obtained, we know that the shaft axis is at right angles to the direction of the unknown field. Now by rotating the instrument about its shaft axis, clockwise in Fig. 4 so as to unwind the spring, but without tipping the instrument until the pointers 11 and 12 read on zero, the large pointer will point in the direction of the north pole of the unknown field. Thus the instrument can be used to determine the direction, inclination, and polarity of unknown fields with accuracy.

The procedure for measuring the strength of an unknown field involves turning the casing of the instrument until the maximum deflection is obtained. The maximum torque occurs when the direction of the unknown field is at right angles to the axis of rotation of the rotor and at right angles to the line of polarization of the rotor 21. Thus in Fig. 4, and assuming the axis of rotation of the instrument has been placed at right angles to the direction of the unknown field by the procedure previously described, the field strength measuring procedure is to simply turn the instrument casing about the axis of its shaft in the direction to wind up the spring until a maximum reading is obtained.

To wind the spring it is evident that in Fig. 4 the casing is turned counterclockwise. The pointer 11 will also move counterclockwise but at a slower rate because the unknown field is getting better torque leverage on the permanent magnet rotor field, and this torque is increasing and becomes a maximum when the 90-degree relation is reached. If the instrument casing is moved counterclockwise beyond the maximum torque position, the magnetic torque will decrease and the spring torque will predominate and very noticeably decrease the instrument reading. In other words, the pointer 11 will move counterclockwise faster than the instrument casing and scale and to reestablish the maximum torque condition, the casing must now be rotated counterclockwise to reduce the spring tension. Hence the maximum magnetic torque condition is easily obtained and recognized and, when obtained, the pointers 11 and 12 are read. It is to be understood that the instrument scale has been previously calibrated by tests with the use of the instrument in known fields, so that the field strength as subsequently measured is directly indicated on the instrument in known terms. Owing to the fact that measurements are always made with the maximum magnetic torque relation or with the same angle between rotor and unknown field directions, the scale is uniform.

In the instrument of Fig. 1, I have included a long spiral spring 15 so as to permit up to four complete revolutions of the large pointer 11 relative to the casing over the measurement range.

The number of such revolutions which occur during a measurement are kept track of by the small pointer 12. Thus measurements over a wide range of field strength are possible. For convenience in making measurements and to prevent abuse of the spring, I prefer to provide a stop 22 to prevent the small pointer 12 from rotation clockwise beyond its zero position. Note that the pointers are geared to rotate in opposite directions. Hence the instrument can only be used by winding up the spring in the proper direction. This of course does not preclude an embodiment wherein the spring, scale markings, and direction of rotation are reversed, as the instrument will operat just as well for either direction of operation.

In Fig. 5, I have shown a magnetometer similar in principle to the one previously described, having a casing 23, window cover 24, scale plate 25, shaft 26, return spring 27, zero adjuster 28, pointer 29, and jeweled upper and lower bearings 30 and 31. Thus instrument is adapted for full scale deflection of less than a complete revolution, for example, 300 degrees. The permanent magnet rotor 32 is mounted at the extreme end of a shaft extension 33 which is bent out and around the lower jewel bearing, and the shaft extension 33 has no bearing support at the magnet rotor end thereof. The tubular shield cap 34 which surrounds the shaft extension 33 and its rotor 32 is removable, and when removed the shaft extension 33 with its rotor 32 can be inserted into flux gaps for measurement purposes which are only slightly larger than the rotor diameter. With a rotor 0.02 inch in diameter a flux gap of the order of $\frac{1}{32}$ inch may be investigated. For most measurement purposes the protective cap 34, which is of nonmagnetic material, will remain in place as it affords mechanical protection to the shaft extension 33 and in no way interferes with the normal use of the instrument where the measurement space available is sufficient for insertion of the cap. Also, in Fig. 5, I have indicated a shunt cap element 35 which may be slipped over the end of cap 34 opposite rotor 32. The shunt cap 34 may be made or partially made of low permeability magnetic material and serves to greatly reduce the sensitivity of the instrument, and can be used temporarily where the field strength to be investigated is unknown and may possibly be of such great intensity as to knock down the permanent magnet 32, or to be in excess of the measurement range of the instrument with the shunt removed. The use of the instrument with the shunt 35 is not recommended for high accuracy measurements, but the shunt may be used for protection in very rough preliminary magnetic field strength surveys. Such a shunt may also be used with the instrument of Fig. 1.

The material which I prefer to use in the permanent magnet rotors 21 and 32 is an alloy of silver, manganese, and aluminum, such as is described in United States Patent No. 2,247,804, July 1, 1941, to Faus. This material has a high coercive force of the order of 6700 oersteds which permits its use in fields as strong as 5000 gauss with satisfactory performance, and because of its low, maximum permeability of the order of 1.11 which minimizes sidewise pull on the rotor in strong fields. By reason of this low maximum permeability, the necessity of stiffer and more expensive shafts and more elaborate bearing constructions is avoided. By reason of the magnetic characteristics of the polarized armature material and its small volume it produces negligible disturbance on the field to be measured which is desirable. The instrument scale of Fig. 4 may be calibrated in gauss such that a full scale reading on scale 13 corresponds to 1000 gauss and the readings on the scale 14 correspond to kilogauss.

What I claim as new and desire to secure by Letters Patent of the United States, is:

1. A magnetometer comprising a pivoted shaft, a pointer on said shaft, a scale with which said pointer cooperates, a spring for rotatively biasing the shaft toward a zero pointer scale indicating position, and a permanent magnet armature on the shaft less than $\frac{1}{16}$ inch in diameter and polarized in a direction at right angles to the shaft and made of an alloy or silver, manganese, and aluminum having a coercive force of the order of 6700 oersteds and a maximum permeability of the order of 1.11.

2. A magnetometer comprising a pivoted shaft, a pointer on one end of the shaft, a graduated scale with which said pointer cooperates, a spring for rotatively biasing the shaft towards a zero pointer scale indication, a casing for containing and supporting said parts having a transparent cover through which the scale and pointer may be read, said casing having a nonmagnetic tubular extension less than ¼ inch in outer diameter into which the opposite end of the shaft extends, and a magnetic armature having a coercive force of the order of 6700 oersteds and a maximum permeability of the order of 1.11 on the end of said shaft which extends within said tubular extension, said armature being polarized in a direction at right angles to the shaft.

3. A magnetometer comprising a casing having a transparent front cover, a shaft pivoted within said casing, a pointer on said shaft, a scale with which the pointer cooperates, said scale and pointer being visible through the transparent cover, a spring secured between the shaft and casing rotatively biasing the shaft to a zero pointer scale indicating position, the shaft having an extension extending out from the rear wall of said casing in the nature of a probe and a magnetic armature having a coercive force of the order of 6700 oersteds and a maximum permeability of the order of 1.11 at the outer end of said shaft extension, said armature being polarized in a direction at right angles to the shaft, said shaft extension and armature having a maximum diameter of less than $\frac{1}{16}$ of an inch, and a nonmagnetic tubular shield over the shaft extension and armature and removably secured to said casing.

4. A magnetometer comprising a casing having a transparent cover part at one end, and a small diameter nonmagnetic tube extending from the main body of the casing at the other end in the nature of a probe, a shaft pivoted within said casing and tube, a pointer at the end of said shaft nearest the transparent cover, a scale with which said pointer cooperates, a spiral spring adjustable from the outside of the casing for rotatively biasing said shaft towards a zero pointer scale indicating position, and an armature of high coercive force, low permeability magnetic material on the other end of said shaft, said armature being polarized in a direction at right angles to the shaft, said armature forming a pivot for said shaft, and a jeweled bearing for said pivot closing the outer end of said tube.

5. A magnetometer comprising a casing having a nonmagnetic tubular extension, a pivoted shaft within the casing and tubular extension, said tubular extension being less than ¼ inch in outside diameter, a pointer on the shaft, a scale within the casing with which the pointer cooperates to indicate the rotative position of the shaft relative to the casing, a spring secured between the shaft and casing for rotatively biasing the shaft to a zero pointer scale indicating position under a zero flux measurement condition and adjustable only for such condition, a single permanent magnet armature on the shaft within said tubular extension shaped and dimensioned as the end portion of said shaft and polarized in a direction at right angles to the shaft and a flux shunt adapted to be removably secured on the tubular extension adjacent the armature, said magnetometer being adapted to measure the strength of unidirectional magnetic fields by inserting the armature in the field to be measured, orienting the instrument until the shaft is at right angles to the direction of the field to be measured and turning the instrument casing about the axis of rotation of the shaft to tension the spring until the maximum pointer scale indication is obtained.

JOHN D. SEAVER.

REFERENCES CITED

The following references are of record in the file of this patent:

UNITED STATES PATENTS

| Number | Name | Date |
|---|---|---|
| 2,211,158 | Pearson | Aug. 13, 1940 |
| 2,247,804 | Faus | July 1, 1941 |

FOREIGN PATENTS

| Number | Country | Date |
|---|---|---|
| 207,680 | Great Britain | Dec. 6, 1923 |
| 378,983 | Great Britain | Aug. 25, 1932 |

OTHER REFERENCES

Physikalische Zeitschrift, May 15, 1934, pp. 409–410.